(No Model.)
T. E. MONTGOMERY.
THREE-WHEELED CYCLE.
No. 595,490. Patented Dec. 14, 1897.
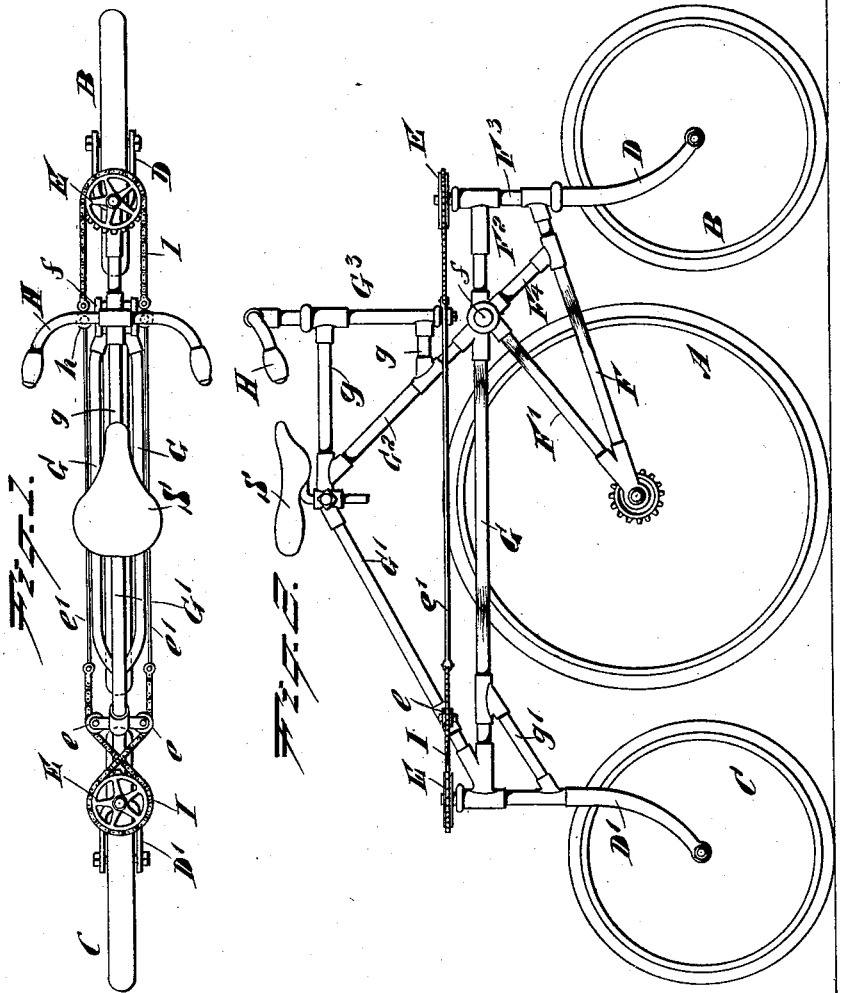
WITNESSES:
Henry T. Hirsch.
H. L. Reynolds.
INVENTOR
T. E. Montgomery
BY
ATTORNEYS.

UNITED STATES PATENT OFFICE.

THEOPHILUS E. MONTGOMERY, OF WILMINGTON, DELAWARE.

THREE-WHEELED CYCLE.

SPECIFICATION forming part of Letters Patent No. 595,490, dated December 14, 1897.

Application filed November 12, 1896. Serial No. 611,875. (No model.)

*To all whom it may concern:*

Be it known that I, THEOPHILUS E. MONTGOMERY, of Wilmington, in the county of New Castle and State of Delaware, have invented a new and Improved Three-Wheeled Cycle, of which the following is a full, clear, and exact description.

My invention relates to an improvement in three-wheeled cycles; and it consists, essentially, in an improved construction for the frame and the steering apparatus therefor.

Reference is to be had to the accompanying drawings, forming part of this specification, in which similar characters of reference indicate corresponding parts in both the figures.

Figure 1 is a top plan view of my improved cycle, and Fig. 2 is a side elevation thereof.

It is well known that the jar in passing over objects is less with the safety-bicycle than with the old style or ordinaries in which the rider was supported almost directly over the wheel. This is due to the jolt being divided between the two wheels, and thus causing a less elevation of the saddle at the time than if the rider were directly over the wheel. This jar has been reduced somewhat by forms of cycles having three wheels placed tandem and with a frame which is pivoted; but these forms, however, have complications which in a measure neutralize their other good points.

The object of my invention is to produce a frame for this style of cycles in which there shall be a single pivot and whereby certain other complications resulting from wheels of this style which have been brought out may be obviated.

In the drawings, A represents the central driving-wheel of the cycle, B the forward steering-wheel, and C the rear wheel, which may also be a steering-wheel. The driving mechanism has not been illustrated, as it is not contemplated to use any form of driving mechanism which shall be novel, but those now in common use, preferably such a form as that known as the "Springfield."

The forward wheel B is supported in a fork D, which is similar in construction to the ordinary steering-fork of a bicycle, and the upper end of this fork is provided with a sprocket-wheel E. A short frame is provided connecting the front wheel B and the central driving-wheel A, this frame consisting of the tubes F, F', F$^2$, and F$^3$, which latter forms the steering-head. An additional tube F$^4$ may be inserted, if desired, although such tube is not essential. The form of this construction may also be very much changed without departing from the essential idea, which is a frame connecting the first two wheels only.

The second section has a steering-fork D', supported upon the rear wheel C. This fork may be attached to the steering apparatus and positively operated thereby or may serve simply to make the rear wheel a trailing wheel. The second section of the frame, as shown, consists of the horizontal bars G, which pass on each side of the driving-wheel, and the two inclined bars G' and G$^2$, which have the saddle-support formed at their apex. A steering-head G$^3$ is supported from the body of the second section of the frame in any suitable manner. I have herein shown two horizontal tubes $g$ as supporting said head. I have also shown a tube $g'$ bracing the rear head, carrying the fork for the rear wheel C.

At its forward end the second section is pivoted to the first by the pivot $f$, which allows a perpendicular pivoting action. This pivot is located midway between the ends of the first section, and in consequence of this the rise at the pivot is one-half that of any object over which the wheels may run. The location of the saddle upon the second section is also made one-third of the distance from the pivot toward the rear wheel, and this results in a rise at the saddle of one-third of the height of the object run over. This form of construction may be departed from considerably without departing from my essential idea. This consists, broadly stated, of a section of the frame supported upon two wheels and a second section supported upon the third wheel and connected at its opposite end to the first section at a point midway between its supports by a single pivot, the saddle being placed directly upon the second section.

In the drawings accompanying this specification I have shown each of the forks as steering-forks. The chain surrounding the sprocket-wheel E upon the rear fork is, however, crossed and led over small pulleys $e$, and its ends are connected to rods $e'$, leading forward to the axis of the handle-bar. The axis of the handle-bar is inside the tube $G^3$ and in line with the pivot $f$. Its lower end has a cross-bar $h$, which engages with the two ends of the chain I, and it also engages with the front ends of the rods $e'$. When the handle-bar is twisted in either direction, it will pull upon the chains and thus turn the chain-wheels E and the steering-wheels of the cycle. The front and rear wheels of the cycle will thus be operated at the same time, so as to steer the wheel in the same direction.

The wheel may be ridden and steered by omitting the steering apparatus entirely from the rear wheel. It will then act as a trailing wheel and will be moved through the action of the forward wheel and the frame.

It will be seen that the frames of this wheel are all short and may thus be made of lighter material than if they were of greater length. The jar due to passing over obstructions will also be reduced and will thus bring less strain upon the frame and avoid the necessity for heavy construction. The method of pivoting, by which the jar is distributed throughout the parts and reduced before reaching the saddle, will make the wheel much easier to ride than the ordinary bicycle. Extra pivots and sliding members have also been done away with, there being only one pivot in the frame.

By using a driving mechanism similar to that mentioned and with my improved form of frame a three-wheeled cycle can be made which will be no longer than the ordinary "safety." It will also be capable of turning as short and be handled fully as well as any prior form of cycle construction. As there are three wheels to support the weight, each wheel may be made lighter than the usual bicycle-wheel.

Having thus fully described my invention, I claim as new and desire to secure by Letters Patent—

1. In a three-wheeled cycle, the combination of a front frame, a drive-wheel mounted therein, a steering-wheel also mounted in the frame in front of the drive-wheel, a rear frame pivoted to the front frame about midway between its ends, said rear frame carrying the saddle, a steering-wheel mounted in the rear frame, and means for simultaneously operating the steering-wheels, substantially as and for the purpose set forth.

2. In a three-wheeled cycle, the combination of a frame comprising two sections pivoted together by a horizontal pivot, one section carrying two wheels and the other one wheel and a saddle-support, the wheels being arranged tandem and one of the said wheels being a steering-wheel, a steering-head on the section carrying one wheel and at the pivoted end thereof, a handle-bar mounted in said head, and a flexible connection between the axis of the handle-bar and the steering-wheel fork, substantially as described.

3. In a three-wheeled cycle, the combination of a front frame, a drive-wheel mounted in the frame, a steering-wheel mounted in said frame in front of the drive-wheel, a rear frame pivoted to the front frame about midway between its ends, a wheel mounted in the rear end of the rear frame, a steering-head carried by the rear frame and arranged directly over the pivot connecting said frame with the front frame, a handle-bar mounted in said head, and a connection between the handle-bar and steering-wheel, substantially as described.

4. In a three-wheeled cycle, the combination of a frame formed of two sections pivoted together by a horizontal pivot, a drive-wheel and steering-wheel mounted in the front section, a steering-wheel in the rear section, a sprocket-wheel on the upper end of the fork of each steering-wheel, a steering-head on the rear section at the pivoted end thereof, a handle-bar mounted in the steering-head and provided with a cross-bar at its lower end, a chain passing around the sprocket-wheel of the front steering-wheel, and having its ends secured to the cross-bar of the handle-bar, a chain passing around the sprocket-wheel of the rear steering-wheel and crossed, and rods secured to the chain and to the cross-bar of the handle-bar, substantially as described.

5. In a three-wheeled cycle, the combination of a frame composed of two sections, one section being supported upon two wheels, one of them provided with a steering-fork, the other section supported upon a third wheel by a steering-fork and upon the first section to which it is pivoted by a horizontal pivot, chain-wheels upon each steering-fork, with chains passing over the same, and connections therefor, which are crossed between the wheels, and steering-handles having a cross-bar attached to opposite sides of the chain, substantially as described.

6. In a three-wheeled cycle, the combination of a frame composed of two sections, one section being supported upon two wheels, one of them provided with a steering-fork, the other section supported upon a third wheel by a steering-fork and upon the first section to which it is pivoted by a horizontal pivot, chain-wheels upon each steering-fork, chains passing over said wheels, and connections therefor which are crossed between the wheels, and a steering-handle having its axis in line with the frame-pivot, and having a cross-bar upon its end which bar is attached to opposite sides of the chain, substantially as described.

7. A frame for cycles having three wheels arranged tandem, consisting of the front section formed of the inclined bars F F', the horizontal bar $F^2$, the vertical bar $F^3$, forming a steering-head, and the inclined bar F⁴, and the rear section hinged to the front section by the horizontal pivot $f$ and formed of the horizontal bars G carrying a head at their rear ends for the rear fork, the inclined bars G' G² at the apex of which the saddle-support is formed, the bars $g$ projecting forwardly from the bar G², and the steering-head G³ carried by the said bars $g$ and in which the handle-bar is mounted, substantially as herein shown and described.

T. E. MONTGOMERY.

Witnesses:
    JOSIAH MARVEL,
    WILLIAM MACFARLAND.